(12) United States Patent
Fux et al.

(10) Patent No.: US 7,809,553 B2
(45) Date of Patent: Oct. 5, 2010

(54) SYSTEM AND METHOD OF CREATING AND USING COMPACT LINGUISTIC DATA

(75) Inventors: Vadim Fux, Waterloo (CA); Michael G. Elizarov, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 41 days.

(21) Appl. No.: 11/778,982

(22) Filed: Jul. 17, 2007

(65) Prior Publication Data

US 2008/0015844 A1    Jan. 17, 2008

Related U.S. Application Data

(63) Continuation of application No. 10/289,656, filed on Nov. 7, 2002, now Pat. No. 7,269,548.

(60) Provisional application No. 60/393,903, filed on Jul. 3, 2002.

(51) Int. Cl.
G06F 17/21 (2006.01)
G06F 17/28 (2006.01)
H03M 7/00 (2006.01)
H03M 7/34 (2006.01)

(52) U.S. Cl. .................. 704/10; 704/7; 704/4; 341/50; 341/51

(58) Field of Classification Search .................. 341/50, 341/51; 704/1–10
See application file for complete search history.

(56) References Cited

U.S. PATENT DOCUMENTS

| | | | |
|---|---|---|---|
| 4,403,303 A * | 9/1983 | Howes et al. ................. 703/27 |
| 5,126,739 A * | 6/1992 | Whiting et al. ............. 341/106 |
| 5,150,119 A * | 9/1992 | Yoshida et al. ................ 341/51 |
| 5,298,895 A * | 3/1994 | Van Maren ................... 341/51 |
| 5,490,061 A * | 2/1996 | Tolin et al. ..................... 704/2 |
| 5,509,088 A * | 4/1996 | Robson ....................... 382/233 |
| 5,778,361 A | 7/1998 | Nanjo et al. |

(Continued)

FOREIGN PATENT DOCUMENTS

GB     2305746 A     4/1997

(Continued)

OTHER PUBLICATIONS

EPO: Communication pursuant to Article 94(3) EPC issued Jan. 27, 2009 for European Application 03762372.5 (5 pages).

(Continued)

*Primary Examiner*—Richemond Dorvil
*Assistant Examiner*—Jialong He
(74) *Attorney, Agent, or Firm*—Finnegan, Henderson, Farabow, Garrett & Dunner, LLP

(57) ABSTRACT

A system and method of creating and using compact linguistic data are provided. Frequencies of words appearing in a corpus are calculated. Each unique character in the words is mapped to a character index, and characters in the words are replaced with the character indexes. Sequences of characters are mapped to substitution indexes, and the sequences of characters in the words are replaced with the substitution indexes. The words are grouped by common prefixes, and each prefix is mapped to location information for the group of words which start with the prefix.

14 Claims, 9 Drawing Sheets

U.S. PATENT DOCUMENTS

| | | | |
|---|---|---|---|
| 5,794,181 A * | 8/1998 | Benbassat et al. | 704/212 |
| 5,798,721 A | 8/1998 | Shibata | |
| 5,818,437 A * | 10/1998 | Grover et al. | 715/811 |
| 5,847,697 A * | 12/1998 | Sugimoto | 345/168 |
| 5,949,355 A | 9/1999 | Panaoussis | |
| 5,951,623 A * | 9/1999 | Reynar et al. | 708/203 |
| 6,016,468 A * | 1/2000 | Freeman et al. | 704/220 |
| 6,023,670 A * | 2/2000 | Martino et al. | 704/8 |
| 6,047,298 A | 4/2000 | Morishita | |
| 6,075,470 A * | 6/2000 | Little et al. | 341/107 |
| 6,169,672 B1 | 1/2001 | Kimura et al. | |
| 6,219,731 B1 * | 4/2001 | Gutowitz | 710/67 |
| 6,414,610 B1 * | 7/2002 | Smith | 341/106 |
| 6,502,064 B1 * | 12/2002 | Miyahira et al. | 704/7 |
| 6,516,305 B1 * | 2/2003 | Fraser | 706/8 |
| 6,646,573 B1 * | 11/2003 | Kushler et al. | 341/28 |
| 6,668,092 B1 * | 12/2003 | Sriram et al. | 382/244 |
| 6,904,402 B1 | 6/2005 | Wang et al. | |
| 7,103,534 B2 * | 9/2006 | Goodman | 704/9 |
| 2003/0085822 A1 * | 5/2003 | Scheuermann | 341/67 |
| 2003/0179114 A1 * | 9/2003 | Kampf | 341/51 |
| 2003/0182279 A1 * | 9/2003 | Willows | 707/4 |

FOREIGN PATENT DOCUMENTS

| | | |
|---|---|---|
| JP | 58-119032 | 7/1983 |
| JP | 07-192095 | 7/1995 |

OTHER PUBLICATIONS

JPO: Notice of Reasons for Rejection issued Oct. 20, 2008 for Japanese Application 2004-518331, and English translation thereof (4 pages, 5 pages).

Kumiko Tanaka et al., "Entering Japanese with Few Button Device", Technical Committee Meeting of the Institute of Electronics, Information, and Communication Engineering, The Institute of Electronics, Information, and Communication Engineering, May 11, 2001, vol. 101, No. 61, 9 pages (in Japanese language).

* cited by examiner

SYSTEM AND METHOD OF CREATING AND USING COMPACT LINGUISTIC DATA

CROSS-REFERENCE TO RELATED APPLICATION

This is a continuation of U.S. patent application Ser. No. 10/289,656, filed on Nov. 7, 2002, now U.S. Pat. No. 7,269,548 which claims priority from U.S. Provisional Application Ser. No. 60/393,903, filed on Jul. 3, 2002.

BACKGROUND

1. Field of the Invention

The present invention relates in general to linguistic data, and in particular to storage and use of the linguistic data for text processing and text input.

2. Description of the State of the Art

The growing use of mobile devices and different types of embedded systems challenges the developers and manufacturers of these devices to create products that require minimal memory usage, yet perform well. A key element of these products is the user interface, which typically enables a user to enter text which is processed by the product.

One application of linguistic data is to facilitate text entry by predicting word completions based on the first characters of a word that are entered by a user. Given a set of predictions that are retrieved from the linguistic data, the user may select one of the predictions, and thus not have to enter the remaining characters in the word.

The prediction of user input is especially useful when included in a mobile device, since such devices typically have input devices, including keyboards, that are constrained in size, Input prediction minimizes the number of keystrokes required to enter words on such devices.

Input prediction is also useful when text is entered using a reduced keyboard. A reduced keyboard has fewer keys than characters that can be entered, thus keystroke combinations are ambiguous. A system that uses linguistic data for input prediction allows the user to easily resolve such ambiguities. Linguistic data can also be used to disambiguate individual keystrokes that are entered using a reduced keyboard.

Existing solutions for storage of linguistic data used for text input and processing typically rely on hash tables, trees, linguistic databases or plain word lists. The number of words covered by these linguistic data formats is limited to the words which have been stored.

The linguistic data which is used in existing text input prediction systems is typically derived from a body of language, either text or speech, known as a corpus. A corpus has uses such as analysis of language to establish its characteristics, analysis of human behavior in terms of use of language in certain situations, training a system to adapt its behavior to particular linguistic circumstances, verifying empirically a theory concerning language, or providing a test set for a language engineering technique or application to establish how well it works in practice. There are national corpora of hundreds of millions of words and there are also corpora which are constructed for particular purposes. An example of a purpose-specific corpus is one comprised of recordings of car drivers speaking to a simulation of a voice-operated control system that recognizes spoken commands. An example of a national corpus is the English language.

SUMMARY

A system of creating compact linguistic data is provided. The system comprises a corpus and linguistic data analyzer. The linguistic data analyzer calculates frequencies of words appearing in the corpus. The linguistic data analyzer also maps each unique character in the words to a character index, and replaces each character in the words with the character index to which the character is mapped. The linguistic data analyzer also maps sequences of characters that appear in the words to substitution indexes, and replaces each sequence of characters in each word with the substitution index to which the sequence of characters are mapped. The linguistic data analyzer also arranges the words into groups where each group contains words that start with a common prefix, and maps each prefix to location information for the group of words which start with the prefix. The compact linguistic data includes the unique characters, the character indexes, the substitution indexes, the location information, the groups of words and the frequencies of the words.

A compact linguistic data structure for a plurality of words is also provided. The words are organized into groups, each group containing words that have a common prefix. The compact linguistic data structure comprises an alphabet comprised of each unique character in the words, a character-mapping table for mapping each character in the alphabet to a character index, a substitution table for mapping sequences of characters from the words to substitution indexes, and a plurality of word definition tables for storing the words. Each word definition table stores each of the words included in one of the groups. The compact linguistic data structure further comprises an offset table for locating the word definition tables. For each of the common prefixes, the offset table contains a location of the word definition table which stores words starting with the common prefix. Each of the words in the word definition tables is encoded by replacing each character in the word with the character index to which the character is mapped by the character-mapping table, and by replacing each sequence of characters from the substitution table that appears in the word with the substitution index to which the sequence of characters is mapped by the substitution table. The common prefixes for words in each word definition table are removed.

A method of creating compact linguistic data is also provided. The method begin with a step of creating a word-list comprising a plurality of words occurring most frequently in a corpus. The method continues with a step of sorting the words in the word-list alphabetically. The method continues with a step of creating a character-mapping table for encoding the words in the word-list by replacing characters in the words with associated character indexes contained in the character-mapping table. The method continues with a step of separating the words in the word-list into groups, wherein words in each group have a common prefix. The method continues with a step of creating a substitution table for encoding the words in the groups by replacing character sequences in the words in the groups with substitution indexes that are mapped to the character sequences by the substitution table. The method continues with a step of encoding the words in the groups into byte sequences using the character-mapping table and the substitution table. The method continues with a step of creating word definition tables and storing the encoded words in the word definition tables. The method continues with a step of creating an offset table for locating groups of encoded words. The method ends with a step of storing the character-mapping table, the substitution table, the word definition tables, and the offset table.

DETAILED DESCRIPTION

A system and method of creating and using compact linguistic data, based on word prefix indexing with statistical character substitution, is provided. The method by which the system stores the linguistic data requires minimal memory usage and provides very fast access to words which begin with a specified prefix and their associated frequencies.

Figure 1:
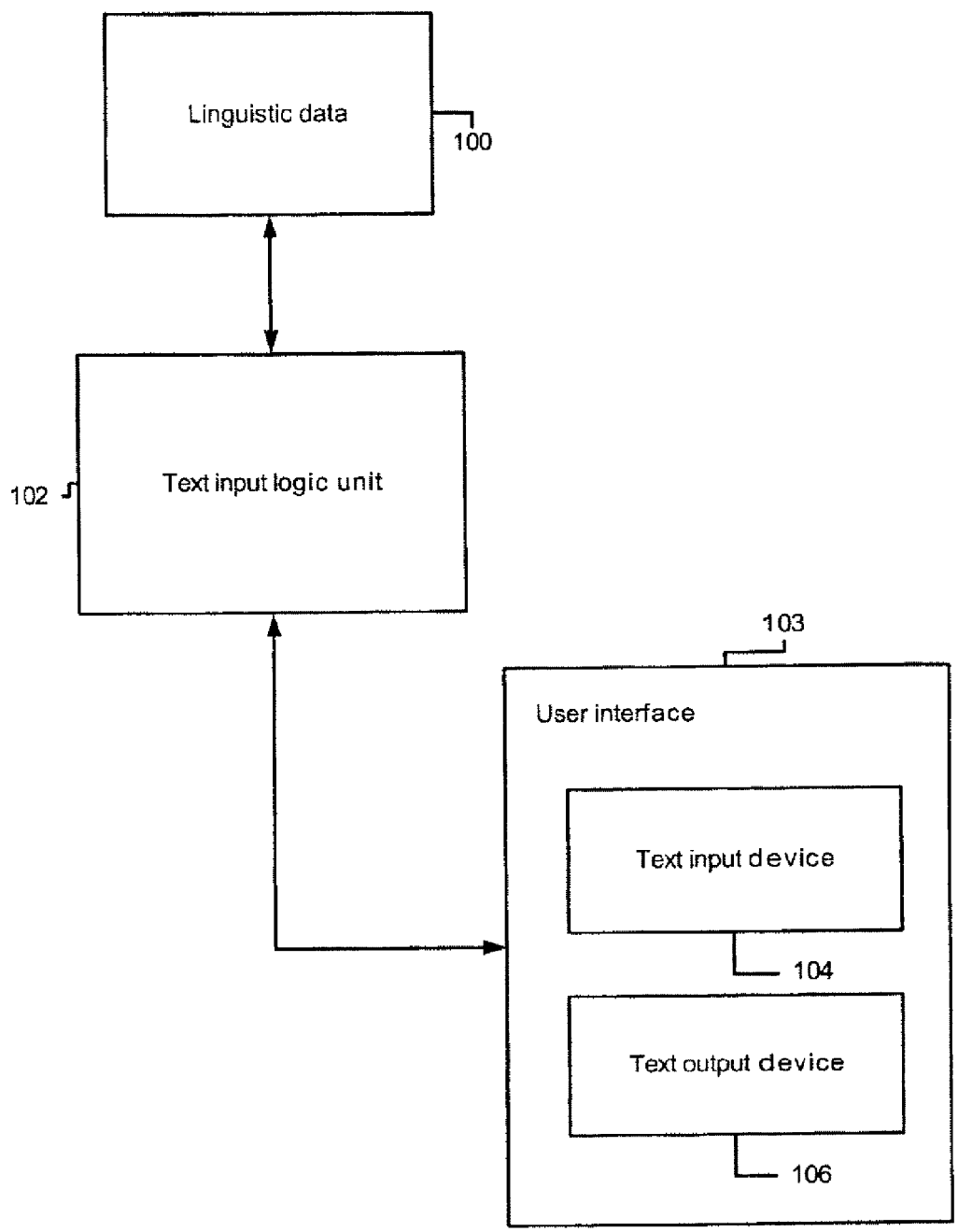
FIG. 1 is a block diagram of a system in which linguistic data is used for text input prediction.

FIG. 1 is a block diagram of a system in which linguistic data is used for text input prediction. The system includes linguistic data 100, a text input logic unit 102, and a user interface 103. The system can be implemented on any computing device requiring text input, but is especially suited for embedded devices with a slow CPU and significant RAM and ROM limitations, such as a mobile communication device.

The user interface 103 includes a text input device 104, which allows a user to enter text into the system. The text input device 104 is any device that enables text entry, such a QWERTY, AZERTY or Dvorak keyboard, or a reduced keyboard. The user interface 103 also includes a text output device 106, which displays text to a user. The text output device 106 may be a graphical component presented on the screen of a mobile device or computer.

The linguistic data 100 is based on word prefix indexing with statistical character substitution, and is described in more detail below.

The text input logic unit 102 may, for example, be implemented by computer instructions which are executed by a computer processor that is contained in a mobile device.

The text input logic unit 102 receives text that is entered by a user using the text input device 104. The text input logic unit 102 then uses the text output device 106 to present the user with predictions of words that the user has started to enter. The predictions are the most probable complete words that start with prefixes entered as text by the user, and are retrieved by the text input logic unit 102 from the linguistic data 100. The user may then select one of the predictions using the text input device 104.

Where the text input device 104 is a reduced keyboard, the text input logic unit 102 also disambiguates individual keystrokes that are received from the reduced keyboard, presenting the user with the most probable characters based on words in the linguistic data 100.

Figure 2:
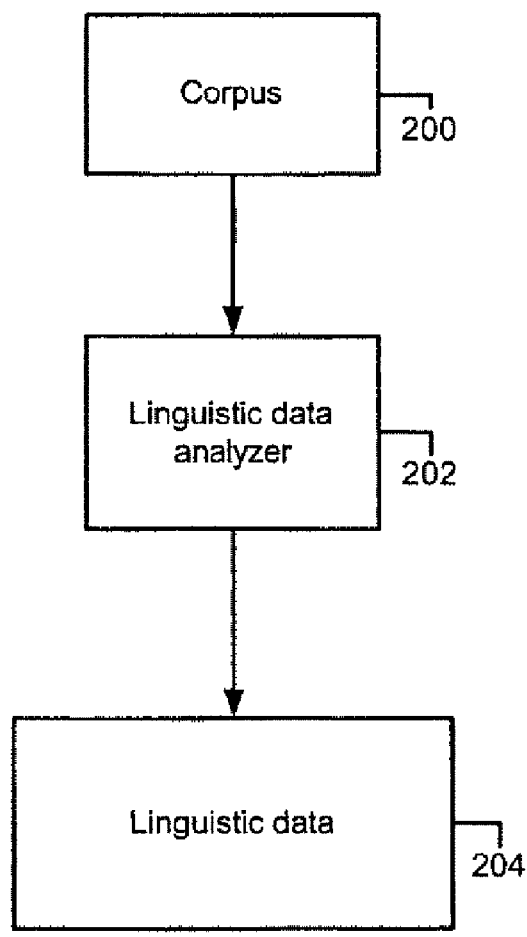
FIG. 2 is a block diagram of a system of creating compact linguistic data.

FIG. 2 is a block diagram of a system of creating compact linguistic data. The linguistic data analyzer 202 creates linguistic data 204, described in detail below, by analyzing the corpus 200 of a natural language, such as English or French. The linguistic data analyzer 202 calculates frequencies of words appearing in the corpus 200, maps each unique character in the words to a character index, replaces characters in the words with the character indexes to which the characters are mapped, maps sequences of characters that appear in the words to substitution indexes, replaces the sequences of characters in the words with the substitution indexes to which the sequences of characters are mapped, arranges the words into groups where each group contains words that start with a common prefix, and maps each prefix to location information for the group of words which start with the prefix.

The analysis of the corpus 200 by the linguistic data analyzer 202 includes the calculation of the absolute frequency of the unique words appearing in the corpus 200. Methods for the calculation of frequency and creation of a word-list are described in FIG. 3 and FIG. 4. Once a word-list has been derived from the corpus 200, the word-list is used to create the linguistic data 204. The linguistic data 204 includes the unique characters, the character indexes, the substitution indexes, the location information, the groups of words and the frequencies of the words. A method for creating the linguistic data 204 is described in FIG. 5, The linguistic data 204 produced by the linguistic data analyzer 202 illustrated in FIG. 6.

The absolute frequency of a certain group of words found in the corpus 200 may alternatively be modified by separating this group to a different file and assigning a custom weight to this file. This group may consist of words which are domain specific, such as names of places or medical terms, and which, based on user preferences, must be included in the resulting word-list. As a result, the absolute value of the frequencies for this group of words will be modified using the weight assigned to the group, so that this group of words will have frequencies that are different they would have otherwise had.

Figure 3:
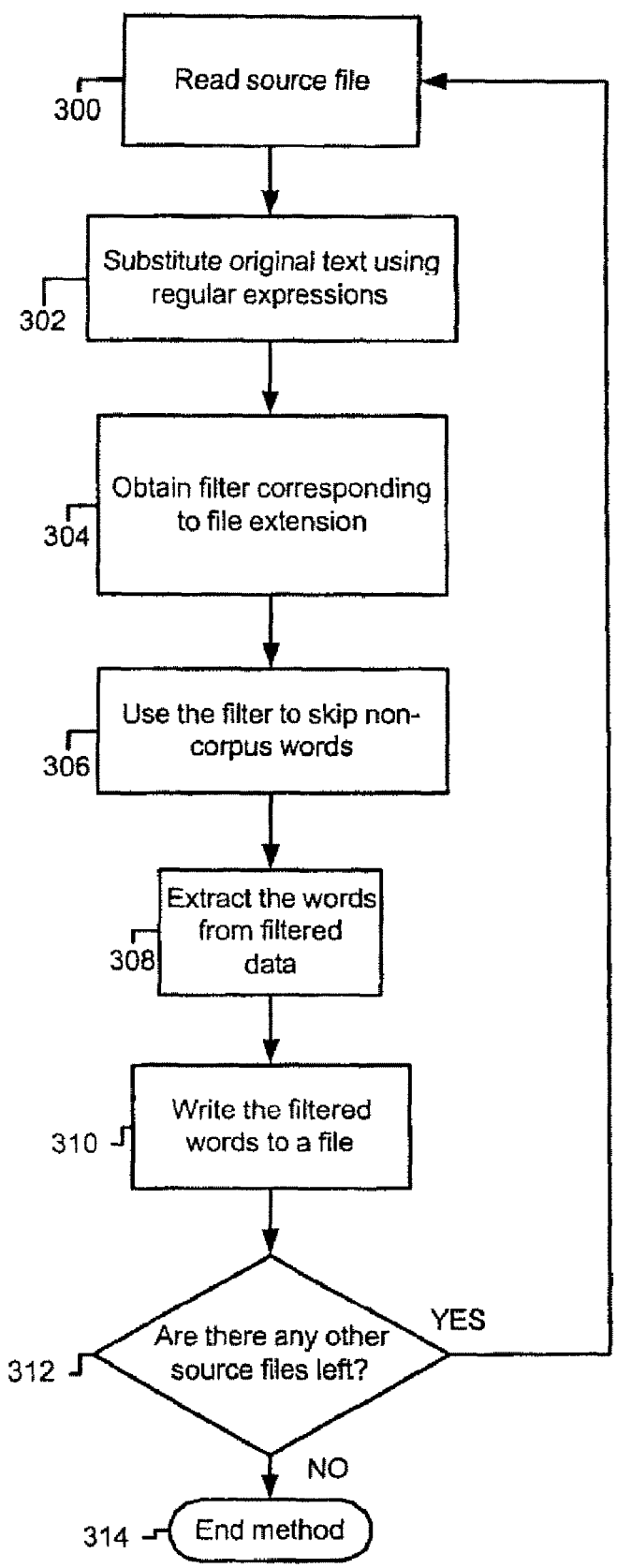
FIG. 3 is flowchart illustrating a method of filtering source files.

FIG. 3 is flowchart illustrating a method of filtering source files. The source files contain text which comprises a corpus. The filtering method is the first step in calculating the frequency of words in the corpus.

The method begins with the step 300 of reading the contents a source file. After the source file is read, the method continues with the step 302 of performing substitution of text from the file according to user preferences, which may be stored in a properties file. The user preferences specify regular expressions which are applied to the text in order to substitute invalid or unwanted characters. For example, a user may not want street names included in the word list, or an Italian user may want to replace "e" followed by a non-letter with "è", or a user may want to skip the last sentence of a text when it is expected that the last sentence contains only the author's name.

The method then continues with the step 304 of obtaining a filter corresponding to the type indicated by the file extension of the source file. For example, if the file extension is ".xml", it is assumed that the file contains an eXtensible Markup Language (XML) document, so an XML filter is obtained Similarly, if the file extension is ".html", then a HyperText Markup Language (HTML) filter is obtained, and if the file extension is ".txt", then a text filter is obtained. Other file extensions may also be mapped to additional filters.

The filter obtained at step 304 is then applied at step 306 in order to remove words which are not part of the corpus, but rather are part of format definitions. For example, an XML filter removes mark-up tags from the text read from the file.

The method continues with the step 308 of extracting the words from the data resulting from step 306, and writing the extracted words to a filtered-words file at step 310.

If it is determined at step 312 that there are more source files to filter, then the method continues at step 300. Otherwise, the method ends at step 314. When the method ends, all of the source files which comprise the corpus have been filtered.

Figure 4:
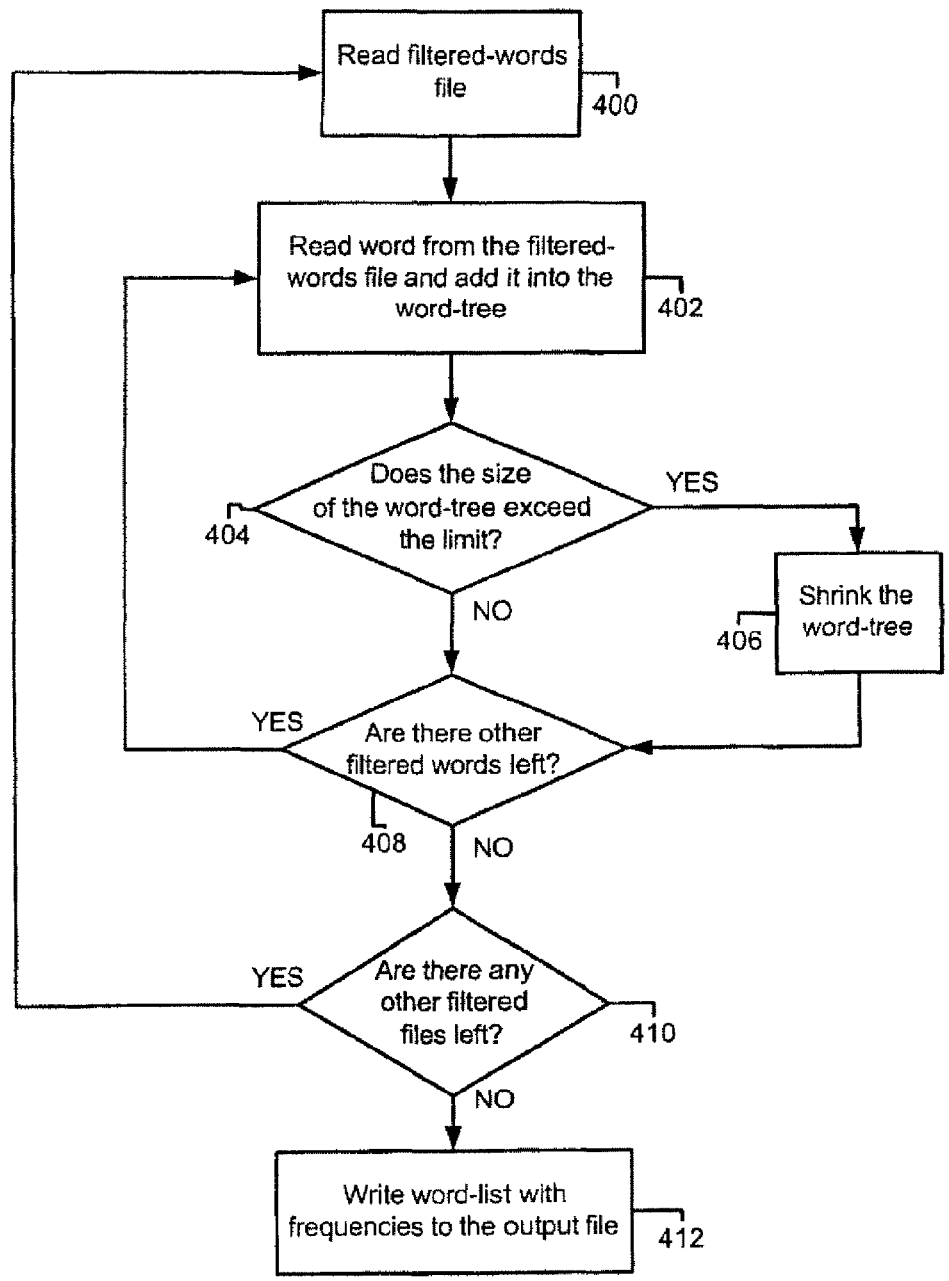
FIG. 4 is flowchart illustrating a method of word frequency calculation.

FIG. 4 is flowchart illustrating a method of word frequency calculation. The method utilizes the filtered-words files that were produced by the method illustrated in FIG. 3. The words from the filtered-words file are loaded into a word-tree. The word-tree is an effective structure to store unique words and their frequencies using minimal memory. The tree is organized such that words that occur frequently in the filtered-words files are located in the inner nodes of the tree, and words that occur less frequently are located in the leaves of the tree. Each node of the tree contains a unique word and the word's absolute frequency. Words are added and deleted from the tree in a fashion that assures that the tree remains balanced.

The method begins with the step 400 of reading a filtered-words file. The method continues with the step 402 of reading a word from the filter-words file and adding it into the word-tree, if the word is not already in the word-tree. The frequency associated with the word in the tree is incremented.

The method continues at step 404, where it is determined if the number of nodes in the tree exceeds a predefined limit, which may be specified in a properties file. If the size of the word-tree does not exceed the limit, then the method continues at step 408. Otherwise, the method continues at step 406.

At step 406, the word-tree is shrunk so that it no longer exceeds the size limit. The tree is shrunk by deleting the least-frequently used words from the tree, which are located in the leaf nodes. The method then continues at step 408.

Step 408 determines whether there are any filtered words left in the filtered-words file. If there are, then the method continues at step 402. If there are no filtered words left, then the method continues at step 410.

Step 410 determines whether there are any remaining filtered-words files to process. If there are, then the method continues at step 400. Otherwise, the method continues at step 412.

At step 412, a word-list which stores words which have been added to the word-tree and their frequencies are written to an output file.

The method illustrated in FIG. 4 allows even very large corpora to be processed by a single computer. The resulting word-list contains up to a predefined limited number of most frequently occurring words in the corpus, and the absolute frequencies associated with the words.

Figure 5:
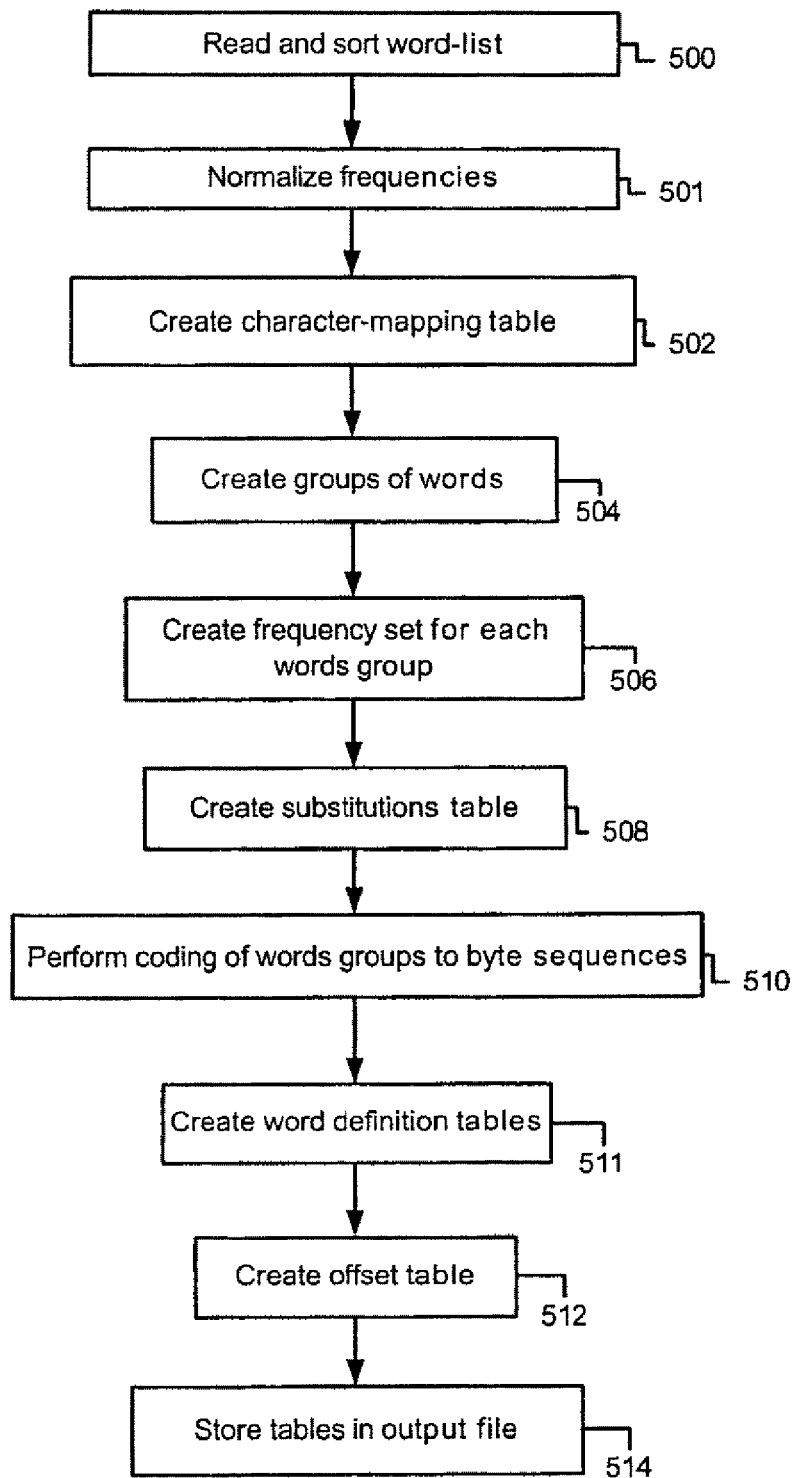
FIG. 5 is a flowchart illustrating a method creating compact linguistic data.

FIG. 5 is a flowchart illustrating a method creating compact linguistic data. The method uses a word-list containing word frequency information to produce compact linguistic data, and includes word prefix indexing and statistical character substitution.

The method beings at step 500, where the word-list is read from an output file that was produced by a method of word frequency calculation such as the method illustrated in FIG. 4. The words in the word-list are then sorted alphabetically.

The method continues with step 501 of normalizing the absolute frequencies in the word-list. Each absolute frequency is replaced by a relative frequency. Absolute frequencies are mapped to relative frequencies by applying a function, which may be specified by a user. Possible functions include a parabolic, Gaussian, hyperbolic or linear distribution.

The method continues with the step 502 of creating a character-mapping table. The character-mapping table is used to encode words in a subsequent step of the method.

When encoding is performed, the characters in the original words are replaced with the character indexes of those characters in the character-mapping table. Since the size of the alphabet for alphabetical languages is much less than 256, a single byte is enough to store Unicode character data. For example, the Unicode character 0x3600 can be represented as 10 if it is located at index 10 in the character-mapping table. The location of a character in the character-mapping table is not significant, and is based on the order that characters appear in the given word-list.

The method continues with the step 504 of separating the words in the word-list into groups. Words in each group have a common prefix of a given length and are sorted by frequency. Words are initially grouped by prefixes that are two characters long. If there are more than 256 words that start with the same two-character prefix, then additional separation will be performed with longer prefixes. For example, if the word-list contains 520 words with the prefix "co", then this group will be separated into groups with prefixes "comr", "con", and so on.

The method continues with the step 506 of producing a frequency set for each group of words. In order to reduce the amount of space required to store frequency information, only the maximum frequency of words in each group is retained with full precision. The frequency of each other word is retained as a percentage of the maximum frequency of words in its group. This technique causes some loss of accuracy, but this is acceptable for the purpose of text input prediction, and results in a smaller storage requirement for frequency information.

The method continues with step 508. In order to reduce the amount of data required to store the words in the word-list, the character sequences that occur most frequently in the words are replaced with substitution indexes. The substitution of n-grams, which are sequences of n-number of characters, enables a number of characters to be represented by a single character. This information is stored in a substitution table. The substitution table is indexed, so that each n-gram is mapped to a substitution index. The words can then be compacted by replacing each n-gram with its substitution index in the substitution table each time the n-gram appears in a word.

The method continues with step 510 of encoding the word groups into byte sequences using the character-mapping table and the substitution table, as described above. The prefixes used to collect words into groups are removed from the words themselves. As a result, each word is represented by a byte sequence, which includes all the data required to find the original word, given its prefix.

The method continues with step 511 of creating word definition tables. The word definition tables store the frequency sets calculated at step 506 and the encoded words produced at 510.

The method continues with step 512 of creating an offset table. The offset table contains byte sequences that represent the groups of words. This table enables the identification of the start of a byte sequences that represents a particular word group. The offset table is used to locate the byte sequences that comprise the encoded words for a particular group that start with a common prefix.

The method concludes with step 514. At this step, the linguistic data resulting from the method has been stored in the tables that have been created. The data tables, including the character-mapping table, the substitution table, the offset table and the word definition tables, are stored in an output file.

Statistical data gathered during the method of creating compact linguistic data may optionally be stored at step 514.

The statistical data includes the frequency with which n-grams stored in the substitution table appear in words in the linguistic data, the number of words in the linguistic data, word-list and corpus from which the word-list was generated, and ratios between the numbers of words in the linguistic data, word-list and corpus.

Figure 6:
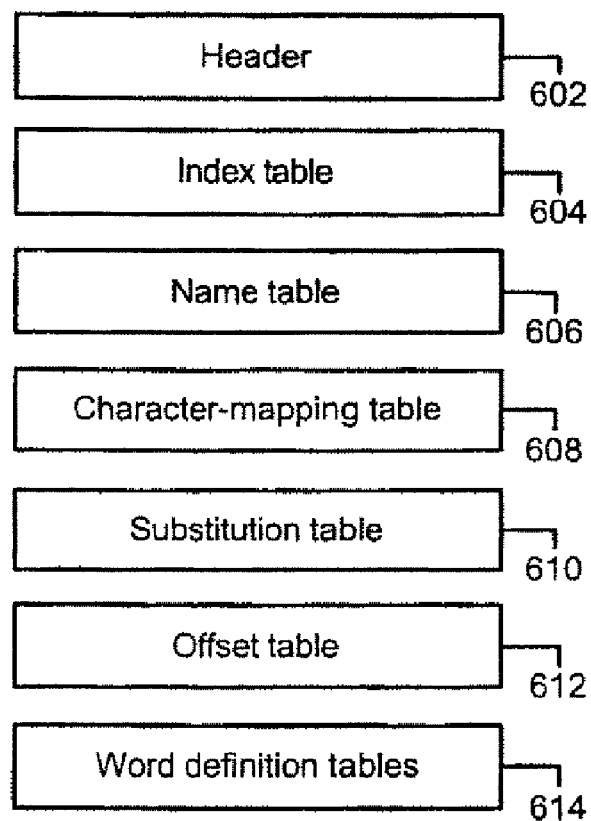
FIG. 6 is a block diagram of a format of compact linguistic data.

FIG. 6 is a block diagram of a format of compact linguistic data. The primary objective of the data format is to preserve the simplicity of interpretation of the linguistic data, while minimizing memory use and the number of computer instructions required to create and interpret the data. Linguistic data in the format is produced by the linguistic data analyzer 202 (FIG. 2), and is the output of the method illustrated by FIG. 5.

The format allows linguistic data to be stored with or without word frequency information. When the linguistic data includes frequency information, learning capabilities, which are described below, can be implemented, and the data can be used to predict input entered with a reduced keyboard. If frequency information is not included, then words which are less than three characters long are not included, since they will not be useful for predicting user input.

The format defines the structure of a computer file which contains a header 602 followed by a number of tables.

The header 602 contains a signature including a magic number, which is a number identifying the format of the file. The header 602 also contains information which specifies the version and priority of the linguistic data contained in the file. Priority information is used to assign relative importance to the linguistic data when multiple files containing linguistic data are used by a text input logic unit. The header 602 also indicates whether the file includes frequency information.

The header 602 is followed by the index table 604. The index table 604 contains indexes in the file to the remaining tables which are defined below, and also allows for additional tables to be added. A table is located using the index information found at the table's entry in the index table 604.

The index table 604 is followed by the name table 606. The name table 606 contains a name which identifies the word-list.

The name table 606 is followed by the character-mapping table 608. The character-mapping 608 table contains the alphabet being used for this word-list, and maps each character in the alphabet to a character index. The alphabet consists of each unique character used in words in the word-list.

The character-mapping table 608 is followed by the substitution table 610. The substitution table 610 contains a bi-gram substitution table, followed by a table for each group of higher-order n-grams which are defined, such as tri-grams, four-grams, and so on. Each n-gram is mapped to a substitution index by the substitution table 610.

The substitution table 610 is followed by the offset table 612. This table is used to locate a word definition table, described below, based on the common prefix of words in the word definition table to be located. For each combination of two characters in the alphabet, the table contains the offset in the file of a word definition table that contains words that start with that combination of characters. For empty groups, the offset is equal to the next non-empty offset. Each offset also specifies whether the word definition table located at the offset in the file is simple or complex, as described below.

Given a two-character sequence, the offset is located at the index in the offset table defined by the formula: ((position of the first character in the alphabet*number of characters in the alphabet)+position of the second character in the alphabet). For example, if the alphabet is English, then the size of the alphabet is 26, so the index of "ab" in the offset table is ((0*26)+1), which equals 1. Hence, the size of the offset table 612 is based on the length of the alphabet.

An inflection table, not shown, may optionally be included in the linguistic data. The inflection table stores word suffixes which may be used in word definitions. A method of inflection analysis in illustrated in FIG. 9.

The linguistic data also contains word definition tables 614. A word definition table stores words from a single word group and frequencies associated with the words, and can be either simple or complex. A simple table is used to define words which are grouped by two-character prefixes only. A complex table is used to define words which are grouped by prefixes of greater lengths.

Words in the definition tables 614 are encoded using the character-mapping table 608 and the substitution table 610. The characters in the words are replaced with the corresponding character indexes from the character-mapping table 608, and the n-grams that are in the substitution table 610 are replaced in the words with their corresponding substitution indexes in the substitution table 610. Since the offset table 612 uniquely maps each bi-gram prefix in the alphabet to a location in the file that defines words that start with that prefix, the prefixes do not need to be retained, and thus are removed from the word definitions.

Upper case words may optionally be marked with an additional special character. The special character is stored in the character-mapping table 608, extending the alphabet with an additional character not used in the language of the words in the word-list.

A simple word definition table contains the encoded words of a group, and the frequencies associated with the words. The frequencies are normalized by applying a normalization function which converts the frequencies so that their values are within a predetermined range. Only the maximum frequency of words in the group is stored with full precision in the table. All other frequencies are stored as percentages of the maximum frequency. The encoded words are sorted by frequency. However, if learning capabilities are applied, as described below, then the initial sorting is no longer valid, and the encoded words may need to be resorted.

As will be appreciated by those skilled in the art, characters are represented in computer systems by sequences of bits. The words in the word definition tables 614 are separated by characters with the most significant bit set. If a character has its most significant bit set, then it is the last character in a word. The character is then treated as if its most significant bit were not set for the purpose of determining the value of the character, so that the most significant bit does not affect the value of the character.

Figure 7:
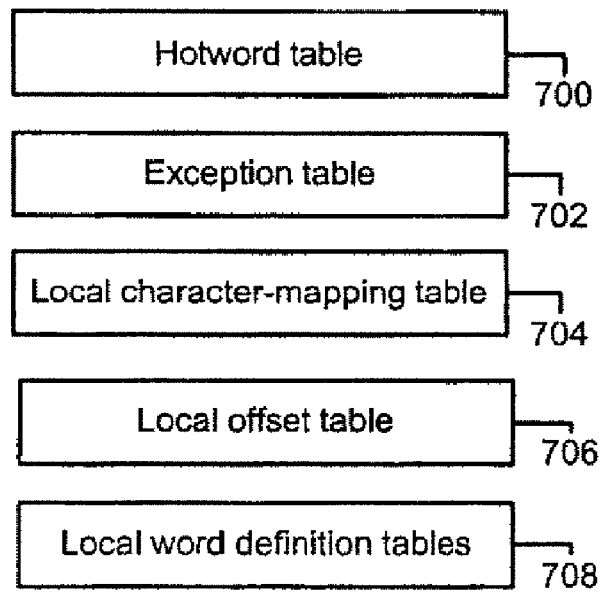
FIG. 7 is a block diagram of a complex word definition table.

FIG. 7 is a block diagram of a complex word definition table. The complex word definition table is recursive, in that it contains local word definition tables 708, each of which is a simple or complex word definition table as described above.

The local word definition tables 708 define words that are grouped by higher order n-gram prefixes. Each of the local word definition tables 708 stores words stored by the word definition table that have a common prefix, where the common prefix for words in each of the local word definition tables 708 is longer than the common prefix for words in the word definition table. The common prefixes of words in the local word definition tables 708 are removed.

For example, if a word group includes words which start with the prefix "co", and there more than 256 words that start with that prefix, then the complex word definition table for "co"-prefixed words contains local word definition tables 708 that define words that start with "com", "con", and so on. The table for "com"-prefixed words could be a complex word definition table that further contains local word definition tables 708 for words starting with "comm" and "comp", while the table for "con"-prefixed words could be a simple word definition table that contains only words starting with "con".

In addition to containing local word definition tables 708, each word definition table includes a local offset table 706, which is used to locate each of the local word definition tables 708. Each offset also indicates whether the table that is referred to by the offset is a complex or simple word definition table.

Each complex word definition table also includes a local character-mapping table 704. This table is functionally the same as the character-mapping table 608 (FIG. 6), except that it only contains characters are included in words that are in local word definition tables 708. The local character-mapping table 704 maps each character in the words in the local word definition tables 708 to a local character index. Words in simple local word definition tables are encoded by replacing characters in the words with the local character indexes.

A complex word definition table also contains a hotword table 700 and an exception table 702. Hotwords are the words associated with the highest frequencies in the group contained in the complex word definition table. The hotword table 700 contains indexes of hotwords that are located in local word definition tables 708 that are simple word definition tables. The exception table 702 stores hotwords that are located in local word definition tables 708 that are complex word definition tables. A hotword can be retrieved quickly using the hotword table 700 and the exception table 702, instead of performing a search of the local word definition tables 708 to find the hotword.

The format of linguistic data described above enables determination of word predictions very quickly, using a minimal amount of memory. When a user enters a word prefix using a text input device that maps characters to unique keys or key combinations, such as a QWERTY keyboard, a text input logic unit retrieves the words in the linguistic data that start with the prefix having the highest frequencies, and presents the predictions to the user. When the user starts to type a word using a reduced keyboard, the word prefix is ambiguous, since each key on a reduced keyboard is mapped to multiple characters. In this case, a text input logic unit retrieves predictions from the linguistic data that start with any of the combinations of characters that correspond to the prefix entered by the user.

The format also allows for easy modification of the words' frequencies, to conform to individual user's text input habits. The user's habits, confirmed by the input choices he or she makes when presented with word prediction alternatives, are learned by the text input logic unit and stored in tables including those described below.

Learning capabilities include the modification of frequency information for words, and the addition of words to the linguistic data. Both operations are based on similar processes of adding the words and corresponding frequency information into a learning word-list. The learning word-list includes tables for frequency modification and for the addition of new words.

Figure 8:
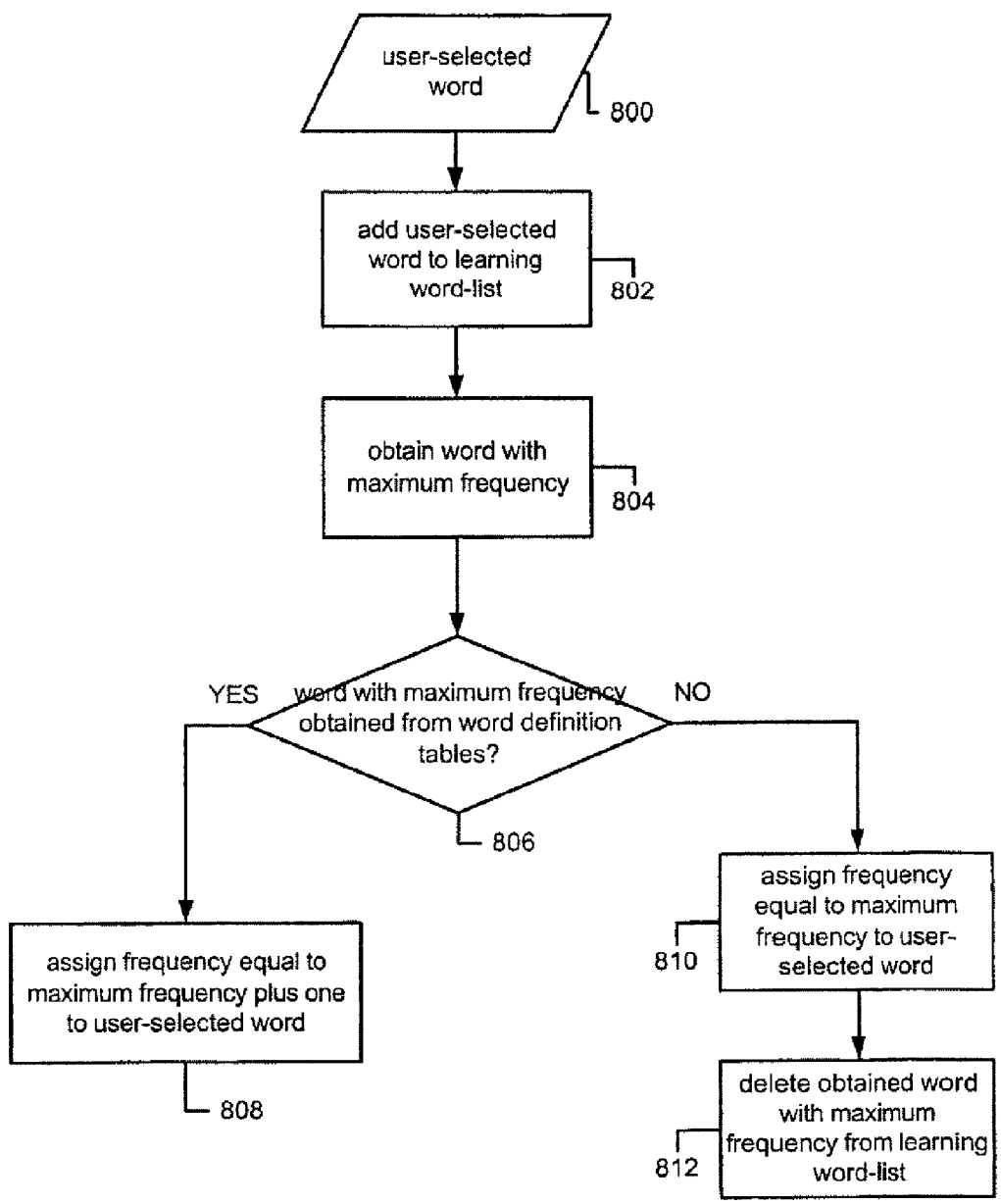
FIG. 8 is a flowchart illustrating a method of frequency modification.

FIG. 8 is a flowchart illustrating a method of frequency modification. The method proceeds on the assumption that the base linguistic data, which is the linguistic data compiled as described above before any learning data is gathered, has correct frequency information in general. Therefore, the method allows for limited modification of the frequency information.

The method starts with the step 802 of adding a user-selected word 800 to the learning word-list. The user-selected word 800 is the word selected by the user from the list of predicted words offered that begin with a word prefix entered by the user. The user selects a prediction using a text input device. The selected word is added to the learning word-list.

The method continues with step 804 of obtaining the word with the maximum frequency of words in the prediction list that was presented to the user. The words in the prediction list and their corresponding frequencies may have been obtained from the word definition tables in base linguistic data, or from the learning word-list. If it is determined at step 806 that the word with maximum frequency was obtained from the word definition tables, then the method continues at step 808, and the user-selected word 800 is assigned a frequency equal to the maximum frequency plus one.

If it is determined at step 806 that the word with maximum frequency was not obtained from the word definition tables, but was rather obtained from the learning word-list, then the method continues at step 810, and the user-selected word 800 is assigned a frequency that is equal to the maximum frequency. The method then ends with step 812 of deleting the word with maximum frequency obtained at step 804 from the learning word-list.

The following paragraphs are examples of the method illustrated in FIG. 8. Each example assumes that the user enters a three-character prefix.

Given the three-character prefix of "beg", and predictions "began", which has a frequency of 3024, "begin", which has a frequency of 2950, "beginning", which has a frequency of 2880, and "begins", which has a frequency of 2000, where all words are obtained from the word definition tables in the base linguistic data, if the user selects the word "begin", then the word "begin" is added to the learning word-list with the frequency 3025.

Given the same three-character prefix "beg", and predictions "begin", which has a frequency of 3025, "began", which has a frequency of 3024, "beginning", which has a frequency of 2880, and "begins", which has a frequency of 2000, where "begin" is obtained from the learning word-list, if the user selects "began", then the word "began" is added to learning word-list with the frequency 3025, and word "begin" is deleted from learning word-list.

The following is an example of the method of FIG. 8 where the three-character prefix is entered using a reduced keyboard. The reduced keyboard includes a key for entering "a", "b" or "c", a key for entering "n" or "o", and a key for entering "w", "xx", or "y". In this example, it is assumed that the user enters the three-character prefix by pressing the "a/b/c" key, then the "n/o" key, and finally the "w/x/y" key. Given the predictions "any", which has a frequency of 3024, "boy", which has a frequency of 2950, "box", which has a frequency of 2880, "bow" which has a frequency of 2000, "cow", which has a frequency of 1890, and "cox" which has a frequency of 1002, where all of the words are obtained from word definition tables in the base linguistic data, if user selects "boy", then the word "boy" is added to learning word-list with a frequency 3025.

The learning word-list includes an updated frequencies table that contains words with updated frequency and a new words table that contains new words. Both of these tables include words which are encoded as in the base linguistic data, using the same character-mapping 608 (FIG. 6) and substitution tables 610 (FIG. 6) as are used by the base linguistic data. Each learning word-list table also includes indexes for the beginnings of words in the table, frequency information associated with the words in the table, and a sorting index that specifies the alphabetically sorted order of the words. Each table also includes a flag which indicates whether the table contains updated frequencies or new words. The learning word-list tables follow sequentially one after the other, with the updated frequencies table appearing first.

If the learning word-list tables reach a maximum-defined length, then the oldest words from the tables are deleted in order to make room for new entries in the tables.

Adding words to and deleting words from a learning word-list table are performed by creating the byte sequence representing the updated table and simultaneously writing the byte sequence into an output stream. After the update is complete, the updated data is reread. The process of writing into an output stream occurs every time words are added or deleted from the learning word-list.

In order to add or delete words from one of the learning word-list tables, the alphabet in the character-mapping table 608 (FIG. 6) is updated if it doesn't contain the characters that appear in words to be added. Words to be added are then encoded using the character-mapping table 608 (FIG. 6) and the substitution table 610 (FIG. 6), and inserted into the beginning of the new words table. Finally, the frequencies and sorting index of the learning word-list table are updated.

Figure 9:
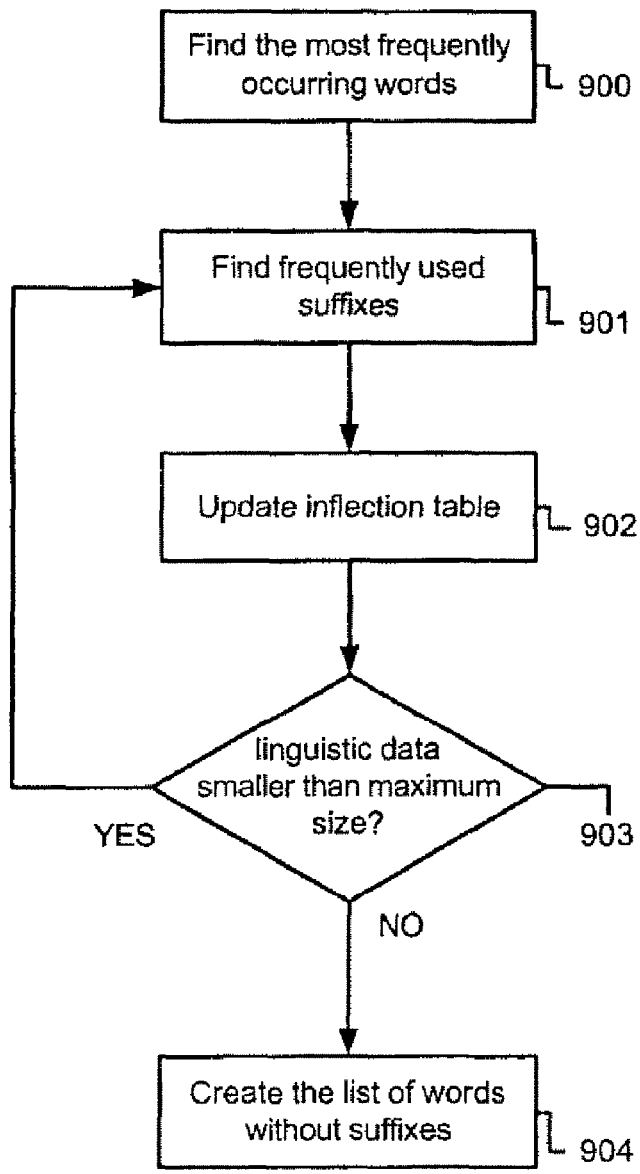
FIG. 9 is a flowchart illustrating a method of inflection analysis.

FIG. 9 is a flowchart illustrating a method of inflection analysis. The system and method of creating compact linguistic data may alternatively include the method of inflection analysis, in which both a list of words that have frequencies higher than a minimum specified frequency and an inflection table are created. The inflection table is created based on statistical suffix analysis, and encapsulates the linguistic rules for word creation in the language of the corpus. The inflection tables make it possible to produce more than one word using the basic word forms stored in the inflection table, ensuring that more words are covered by the linguistic data, while the basic word-list remains compact. An inflection table may optionally be included in the linguistic data format shown in FIG. 6.

The method begins with the step 900 of finding a configured number of words that occur most frequently in the word-list, based on the absolute frequency of the words.

The method continues with the step 901 of finding suffixes of the frequently occurring words. The step of suffix finding is based on an iterative search of suffixes of decreasing length, starting with suffixes that are six characters long and ending with suffixes that are two characters long. These suffixes do not always match the existing counterparts in the grammar of the given language, but rather the suffix finding is based on the number of occurrences of suffixes in the word-list.

The method continues with the step 902 of updating the inflection table with the suffixes found in the previous step. The first time step 902 is performed, the inflection table is created before it is updated.

At step 903, if the size of the linguistic data is smaller than a configured maximum size, then the method continues at step 901. Otherwise, the method concludes with the step 904 of creating a list of the words in the word-list without the suffixes contained in the inflection table.

The inflection table and the list of words without suffixes can then be encoded as described above in reference to FIG. 5. When the method of inflection analysis is used, the resulting compact linguistic data as illustrated in FIG. 6 also includes the inflection table. The words in the word definition tables 614 (FIG. 6) then do not include the suffixes that are included in the inflection table, but rather contain references to the suffixes in the inflection table. The space saved by using the inflection table for each suffix stored is the number of occurrences of the suffix, multiplied by the length of the suffix.

The above description relates to one example of the present invention. Many variations will be apparent to those knowledgeable in the field, and such variations are within the scope of the application.

For example, while the language used in most of the examples is English, the system and method provided creates compact linguistic data for any alphabetical language.

In addition, the system and method of creating and using compact linguistic data can be implemented as software, firmware, or hardware, or as a combination thereof, on personal computers, PDAs, cellular telephones, two-way pagers, wearable computers of any sort, printers, set-top boxes and any other devices allowing text input and display.

Also, the methods illustrated in FIGS. 3, 4, 5, 8 and 9 may contain fewer, more or different steps than those that are shown. For example, although the methods describe using computer files to store final and intermediate results of the methods, the results could also be stored in computer memory such as RAM or Flash memory modules.

What is claimed as the invention is:

1. A system for creating compact linguistic data, comprising:
   a processor; and
   a memory coupled to the processor, the memory comprising:
   a corpus; and
   a linguistic data analyzer, wherein the linguistic data analyzer comprises instructions that, when executed by the processor, cause the processor to:
   calculate frequencies of words appearing in the corpus, map each unique character in the words to a character index, replace each character in the words with the character index to which the character is mapped, map sequences of characters that appear in the words to substitution indexes, replace each sequence of characters in each word with the substitution index to which the sequence of characters are mapped, arrange the words into groups where each group contains words that start with a common prefix, calculate frequencies of the groups of words appearing in the corpus, and map each prefix to location information for the group of words which start with the prefix, and
   wherein the processor uses a structure to calculate the frequencies of the words appearing in the corpus such that more frequently occurring words are located at inner nodes of the structure and less frequently occurring words are located at outer nodes of the structure; and
   wherein the compact linguistic data includes the unique characters, the character indexes, the substitution indexes, the location information, the groups of words, the frequencies of the words and the frequencies of the groups of words.

2. The system of claim 1, further comprising:
   a user interface, comprising:
   a text input device; and
   a text output device; and
   a text input logic unit,
   wherein the text input logic unit receives a text prefix from the text input device, retrieves a plurality of predicted words from the compact linguistic data that start with the text prefix, selects one of the plurality of predicted words for display based on the frequencies of the plurality of predicted words, and displays the one predicted words using the text output device.

3. The system of claim 2, wherein the text input device is a keyboard.

4. The system of claim 3, wherein the keyboard is a reduced keyboard.

5. The system of claim 2, wherein the user interface and the text input logic unit are implemented on a mobile communication device.

6. The system of claim 2, wherein the text input logic unit selects one of the groups of words as the plurality of predicted words.

7. The system of claim 6, wherein the selected group of words is selected based on the frequency of the group of words.

8. The system of claim 2, wherein the text input logic unit is configured to update the frequencies of the words based on whether the predicted word is input by a device user.

9. The system of claim 1, wherein for each group, only the maximum frequency, which is the highest frequency value in the group, is retained with full precision, and the frequencies of words with less than the maximum frequency are retained as a percentage of the maximum frequency.

10. A mobile communication device, comprising:
a text input device that receives a text input;
a computer-readable medium encoded with a compact linguistic data structure for a plurality of words, wherein the words are organized into groups, each group containing words that have a common prefix;
a text input logic program that uses the compact linguistic data structure to predict a word from the text input; and
a text output device that displays the predicted word;
wherein the compact linguistic data structure comprises:
a plurality of word definition tables for storing the words, each word definition table storing each of the words included in one of the groups and storing a plurality of frequencies associated with the words; and
an offset table for locating the word definition tables, wherein for each of the common prefixes, the offset table contains a location of the word definition table which stores words starting with the common prefix;
wherein at least one of the word definition tables comprises:
a plurality of local word definition tables for storing the words stored by the word definition table, each local word definition table storing the words stored by the word definition table that have a common prefix that is longer than the common prefix for the words in the word definition table;
a local offset table for locating each of the local word definition tables;
a local character-mapping table for mapping each character in the words in the local word definition tables to a local character index;
a hotword table for storing the location in the local word definition tables of words which are associated with highest frequencies of words in the group contained in the word definition table; and
an exception table for storing words which are associated with highest frequencies of words in the group contained in the word definition table,
wherein each of the words in the local word definition tables is encoded by replacing characters in the word with the local character index to which the character is mapped by the local character-mapping table, and by replacing each sequence of characters from a substitution table that appears in the word with a substitution index to which the sequence of characters is mapped by the substitution table, and
wherein the common prefixes of the words in the local word definition tables are removed.

11. The mobile communication device of claim 10, further comprising a name table, the name table comprising a name for identifying the words.

12. The mobile communication device of claim 10, further comprising an inflection table for storing suffixes of the words, wherein the words stored in the word definition tables refer to the suffixes stored in the inflection table.

13. The mobile communication device of claim 10, wherein characters in the words are represented by sequences of bits having a most significant bit, wherein the most significant bit in the last character in each of the words in the word definition tables is set, and wherein a value of each character in the words is determined based on bit values of bits other than the most significant bit.

14. A mobile communication device, comprising:
a text input device that receives a text input;
a computer-readable medium encoded with a compact linguistic data structure for a plurality of words, wherein the words are organized into groups, each group containing words that have a common prefix;
a text input logic program that uses the compact linguistic data structure to predict a word from the text input; and
a text output device that displays the predicted word;
wherein the compact linguistic data structure comprises:
a plurality of word definition tables for storing the words, each word definition table storing each of the words included in one of the groups; and
an offset table for locating the word definition tables, wherein for each of the common prefixes, the offset table contains a location of the word definition table which stores words starting with the common prefix;
wherein characters in the words are represented by sequences of bits having a most significant bit, wherein the most significant bit in the last character in each of the words in the word definition tables is set, and wherein a value of each character in the words is determined based on bit values of bits other than the most significant bit;
a plurality of frequencies associated with the words, wherein the word definition tables store the frequencies;
wherein at least one of the word definition tables comprises:
a plurality of local word definition tables for storing the words stored by the word definition table, each local word definition table storing the words stored by the word definition table that have a common prefix that is longer than the common prefix for the words in the word definition table;
a local offset table for locating each of the local word definition tables;
a local character-mapping table for mapping each character in the words in the local word definition tables to a local character index;
a hotword table for storing the location in the local word definition tables of words which are associated with highest frequencies of words in the group contained in the word definition table; and
an exception table for storing words which are associated with highest frequencies of words in the group contained in the word definition table, wherein each of the words in the local word definition tables is encoded by replacing characters in the word with the local character index to which the character is mapped by the local character-mapping table, and by replacing each sequence of characters from a substitution table that appears in the word with a substitution index to which the sequence of characters is mapped by the substitution table, and wherein the common prefixes of the words in the local word definition tables are removed.

* * * * *

UNITED STATES PATENT AND TRADEMARK OFFICE
CERTIFICATE OF CORRECTION

| | |
|---|---|
| PATENT NO. | : 7,809,553 B2 |
| APPLICATION NO. | : 11/778982 |
| DATED | : October 5, 2010 |
| INVENTOR(S) | : Vadim Fux et al. |

It is certified that error appears in the above-identified patent and that said Letters Patent is hereby corrected as shown below:

In column 1, lines 8-9, delete the break between "7,269," and "548" should read --7,269,548--.

In column 1, line 37, "size, Input" should read --size. Input--.

In column 2, line 45, "method begin" should read --method begins--.

In column 3, line 7, "is flowchart" should read --is a flowchart--.

In column 3, line 9, "is flowchart" should read --is a flowchart--.

In column 3, line 39, "such a" should read --such as--.

In column 4, line 24, "FIG. 5, The linguistic" should read --FIG. 5. The linguistic--.

In column 4, line 25, "analyzer 202 illustrated" should read --analyzer 202 is illustrated--.

In column 4, line 35, "different they" should read --different than they--.

In column 4, line 36, "is flowchart" should read --is a flowchart--.

In column 4, lines 40-41, "contents a source" should read --contents of a source--.

In column 4, line 47, "word list," should read --word-list,--.

In column 4, line 48, "replace "e" followed" should read --replace "e'" followed--.

In column 4, line 57, "obtained Similarly," should read --obtained. Similarly,--.

Signed and Sealed this

Seventh Day of December, 2010

David J. Kappos
*Director of the United States Patent and Trademark Office*

CERTIFICATE OF CORRECTION (continued)
U.S. Pat. No. 7,809,553 B2

In column 5, line 6, "is flowchart" should read --is a flowchart--.

In column 5, line 21, "filter-words" should read --filtered-words--.

In column 5, line 54, "beings" should read --begins--.

In column 6, line 19, "prefixes "comr"," should read --prefixes "com",--.

In column 6, lines 51-52, "produced at 510." should read --produced at step 510.--.

In column 6, line 56, "a byte sequences" should read --a byte sequence--.

In column 7, line 42, "character-mapping 608 table" should read --character-mapping table 608--.

In column 8, line 6, "analysis in illustrated" should read --analysis is illustrated--.

In column 8, line 63, "there more" should read --there are more--.

In column 9, line 14, "characters are included" should read --characters that are included--.

In column 10, line 40, "added to learning" should read --added to the learning--.

In column 10, line 41, "and word" should read --and the word--.

In column 10, line 42, "from learning" should read --from the learning--.

In column 10, line 47, ""xx"," should read --"x",--.

In column 10, line 52, "2880, "bow" which" should read --2880, "bow", which--.

In column 10, line 53, "and "cox" which" should read --and "cox", which--.

In column 10, line 55, "if user" should read --if the user--.

In column 10, line 56, "to learning" should read --to the learning--.

In claim 2, column 12, line 66, "one predicted words" should read --one predicted word--.